(12) United States Patent
Shao et al.

(10) Patent No.: US 11,625,028 B1
(45) Date of Patent: Apr. 11, 2023

(54) INDUSTRIAL INTERNET OF THINGS WITH DUAL INDEPENDENT PLATFORM AND CONTROL METHODS THEREOF

(71) Applicant: CHENGDU QINCHUAN IOT TECHNOLOGY CO., LTD., Sichuan (CN)

(72) Inventors: Zehua Shao, Chengdu (CN); Xiaojun Wei, Chengdu (CN); Haitang Xiang, Chengdu (CN); Yong Li, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/807,734

(22) Filed: Jun. 20, 2022

(30) Foreign Application Priority Data

Apr. 2, 2022 (CN) .......................... 202210340263.1

(51) Int. Cl.
*G05B 19/418* (2006.01)
(52) U.S. Cl.
CPC ... *G05B 19/41865* (2013.01); *G05B 19/4183* (2013.01); *G05B 19/4185* (2013.01); *G05B 19/41815* (2013.01)
(58) Field of Classification Search
USPC .......................................................... 700/95
See application file for complete search history.

(56) References Cited

U.S. PATENT DOCUMENTS 10,575,072 B1 * 2/2020 Shao .................. H04Q 9/00
2016/0313294 A1 10/2016 Dattilo et al.
(Continued)

FOREIGN PATENT DOCUMENTS

CN 102567812 B 12/2014
CN 107172128 A 9/2017
(Continued)

OTHER PUBLICATIONS

Shao, Zehua, Exploration and Research on the Structure of Internet of Things, Internet of Things Technologies Reliable Transmission, 2015, 10 pages.
(Continued)

*Primary Examiner* — Hien D Khuu
(74) *Attorney, Agent, or Firm* — Metis IP LLC

(57) ABSTRACT

The present disclosure discloses an Industrial Internet of Things (IIoT) with a dual independent platform, which comprises a user platform, a service platform, a management platform, a sensor network platform and an object platform that interact in turn. The service platform adopts centralized layout, and the management platform and the sensor network platform adopt independent layout. The present disclosure also discloses a control method of the IIoT with the dual independent platform. The present disclosure builds the IIoT based on the five platform structure, in which the sensor network platform and the management platform are arranged independently, and each corresponding platform includes a plurality of independent sub-platforms, so that the independent sensor network platform and the management platform can be used for each production line device to form an independent data processing channel and transmission channel, and reduce the data processing capacity and transmission capacity of each platform.

20 Claims, 6 Drawing Sheets

(56) References Cited

U.S. PATENT DOCUMENTS

2019/0339221 A1 11/2019 Bhavaraju et al.
2022/0245574 A1* 8/2022 Celia .................. G06F 9/451

FOREIGN PATENT DOCUMENTS

| CN | 108377207 | A |   | 8/2018  |                |
|----|-----------|---|---|---------|----------------|
| CN | 109284544 | A |   | 1/2019  |                |
| CN | 110073301 | A | * | 7/2019  | ......... A01B 3/02 |
| CN | 209085657 | U | * | 7/2019  | ...... B62D 15/0215 |
| CN | 111580479 | A |   | 8/2020  |                |
| CN | 114449023 | A |   | 5/2022  |                |
| CN | 114488988 | A |   | 5/2022  |                |
| TW |   I749925 | B |   | 12/2021 |                |
| WO | 2019041734| A1|   | 3/2019  |                |

OTHER PUBLICATIONS

Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
White Paper on Urban Brain Development, Smart City Standard Working Group of National Beacon Commission, 2022, 59 pages.
Decision to Grant a Patent for Invention in Chinese Application No. 202210340263.1 dated Jul. 1, 2022, 5 pages.

* cited by examiner

200

| S1 | The object platform includes a main production line device and at least one sub-production line device of the same type as the main production line device, the main production line device and the at least one sub-production line device are configured with data collectors, respectively. |

| S2 | When the main production line device executes manufacturing according to the different configuration files at different execution times, the data collector of the main production line device collects finished product parameters of the main production line device under the control of different configuration files in unit time and transmits the finished product parameters to a main platform of the sensor network platform, the different configuration files include at least two manufacturing parameters of the same type with different values. |

| S3 | The main platform of the sensor network platform converts the finished product parameters into data files that can be recognized by the management platform, and sends the data files to the main platform of the management platform. |

| S4 | The main platform of the management platform integrates the data files with the corresponding manufacturing parameters, selects an optimal finished product parameter according to a calculation rule, and packages and sends the manufacturing parameters corresponding to the optimal finished product parameter to the service platform as final manufacturing parameters. |

| S5 | The service platform receives the final manufacturing parameters and stores them, and when the user platform issues an instruction of executing covering manufacturing parameters, sends the final manufacturing parameters to at least one sub-platform of the management platform. |

| S6 | Each of the at least one sub-platform of the management platform stores and processes the final manufacturing parameters and sends them to each corresponding sub-platform of the sensor network platform. |

| S7 | The each sub-platform of the sensor network platform receives the final manufacturing parameters, converts them into configuration files and sends them to each corresponding sub-production line device. |

| S8 | The each sub-production line device performs manufacturing according to the received configuration files. |

```
┌─────────────────────────────────────────────┐
│ The main platform of the management platform can obtain the
│ test results of the finished products when the main production
│ line device performs manufacturing (or processing) according     ~302
│ to the different configuration files at the different execution
│ times.
└─────────────────────────────────────────────┘
                        │
                        ▼
┌─────────────────────────────────────────────┐
│ The main platform of the management platform can determine
│ the preliminary target manufacturing parameters based on the    ~304
│ test results.
└─────────────────────────────────────────────┘
                        │
                        ▼
┌─────────────────────────────────────────────┐
│ The service platform can adjust the preliminary target
│ manufacturing parameters, determine the target
│ manufacturing parameters corresponding to the main              ~306
│ production line device and the at least one sub production line
│ device, respectively, and the target manufacturing parameters
│ are included in the configuration files.
└─────────────────────────────────────────────┘
```

FIG.3

INDUSTRIAL INTERNET OF THINGS WITH DUAL INDEPENDENT PLATFORM AND CONTROL METHODS THEREOF

CROSS-REFERENCE TO RELATED APPLICATION

This application claims priority of Chinese Application No. 202210340263.1, filed on Apr. 2, 2022, the entire contents of which are hereby incorporated by reference.

TECHNICAL FIELD

The present disclosure relates to intelligent manufacturing techniques, and specifically relates to IIoT with a dual independent platform and control methods thereof.

BACKGROUND

In large factories or workshops, the same process, accessories or products may need to be manufactured with multiple production line devices of the same type at the same time to complete the manufacturing requirements in large quantities or within the specified processing time.

In the prior art, when multiple production line devices of the same type perform manufacturing, different production line device often manufacture independently, and the processing parameters of each production line equipment are different, resulting in different production line equipment having high or low quality for finished products. In order to improve the quality of finished products of all production line equipment of the same type, it is not only necessary to find out the production line equipment with the best quality of finished products, It is also necessary to extract the manufacturing parameters of the production line equipment, and finally update the manufacturing parameters of other production line equipment, which not only has a huge workload, time-consuming and labor-consuming, but also affects the manufacturing operations of all production line equipment. Moreover, even if the manufacturing parameters corresponding to the production line equipment with the best finished product quality are found, the manufacturing parameters are not the optimal processing parameters of this type of production line equipment in practical application.

With the increasing improvement of intelligent manufacturing technology, how to use intelligent manufacturing technology to solve the above technical problems is what is urgently needed to achieve.

SUMMARY

The technical problem to be solved by the present disclosure is to provide industrial Internet of Things with a dual independent platform. The IIoT continuously executes different manufacturing parameters through the main production line device, so as to obtain the optimal manufacturing parameters, and directly updates all sub-production line devices through the IoT structure, so as to realize the intelligent optimization and intelligent coverage of manufacturing parameters and improve the finished product quality of all production line devices. At the same time, it simplifies the process of parameter update and reduces the time and cost of data update.

The present disclosure is realized through the following technical scheme: an industrial IoT with a dual independent platform, including a user platform, a service platform, a management platform, a sensor network platform and an object platform which are interacted in sequence.

The user platform is configured as a terminal device, and interacts with users.

The service platform is configured as the first server, receives instructions from the user platform and transmits to the management platform, and extracts information required to process the user platform from the management platform and transmits to the user platform.

The management platform is configured to the second server, controls the operation of the object platform, and receives the feedback data of the object platform.

The sensor network platform is configured as a communication network and a gateway for interaction between the object platform and the management platform.

The object platform is configured as production line devices and data collectors for perform manufacturing.

The service platform adopts centralized layout, and the management platform and sensor network platform adopt independent layout. The centralized layout means that the service platform uniformly receives data, processes the data and sends the data. The independent layout means that the management platform or the sensor network platform adopts different platforms for storage, processing and/or transmission of data from different object platforms.

The object platform includes a main production line device and at least one sub-production line device of the same type as the main production line device. The main production line device and several sub-production line devices are equipped with data collectors.

When the main production line equipment performs manufacturing according to different configuration files at different execution times, the data collector of the main production line equipment collects the finished product parameters of the main production line device under the control of different configuration files in a unit time, and transmits the finished product parameters to the main platform of the sensor network platform. The different configuration files include a plurality of manufacturing parameters of the same type but with different values.

The main platform of the sensor network platform converts the finished product parameters into data files that can be recognized by the management platform, and sends the data files to the main platform of the management platform;

The main platform of the management platform integrates the data files with the corresponding manufacturing parameters, selects the optimal finished product parameter according to the calculation rule, and packages and sends the manufacturing parameters corresponding to the optimal finished product parameter to the service platform as the final manufacturing parameters;

The service platform receives and stores the final manufacturing parameter, when the user platform sends an instruction of executing the covering manufacturing parameters, the service platform sends the final manufacturing parameters to at least one sub-platform of the management platform, Each of at least one sub-platform of the management platform stores and processes the final manufacturing parameters and sends them to the sub-platform of the corresponding sensor network platform;

Each sub-platform of the sensor network platform receives the final manufacturing parameters, converts them into configuration files and sends them to each corresponding sub-production line device;

Each sub-production line device performs manufacturing according to the received configuration files.

Based on the above IoT technical scheme, the different configuration files of the main production line device are obtained in the following ways:

When the service platform receives the instruction from the user platform to modify the manufacturing parameters, the service platform sends a modification instruction to the main platform of the management platform.

The main platform of the management platform receives the modification instruction and retrieves a pre-stored parameter data packet, and transmits the parameter data packet to the corresponding main platform of the sensing network platform. The parameter data packet comprises at least two manufacturing parameters of the same type with different values and different execution times corresponding to different manufacturing parameters;

The main platform of the sensor network platform receives the parameter data packet, sorts the at least two manufacturing parameters of the parameter data packet according to the order of the execution times to form at least two configuration files; and according to different execution times, sends the configuration files at the corresponding to the execution times to the main production line device.

Based on the above IoT technical scheme, the parameter data packet is in the form of one or more groups.

When the parameter data packet is in the form of multiple groups, the modification instruction at least includes an extraction time or extraction time interval of each group of parameter data packets.

The main platform of the management platform successively extracts the each corresponding group of parameter data packets of according to the extraction time or extraction time interval.

Based on the above IoT technical scheme, when the covering manufacturing parameter instruction includes the execution time, the sub-platform of the management platform writes the execution time into the corresponding final manufacturing parameters.

After receiving the final manufacturing parameters, the sub-platform of the sensor network platform extracts the execution time, converts the final manufacturing parameters into configuration files, and sends the configuration files to the corresponding sub-production line device according to the execution time.

Based on the above IoT technology solutions, that the main platform of the management platform integrates the data files with the corresponding manufacturing parameters, and selects the optimal finished product parameter according to a calculation rule, and packages and sends the manufacturing parameters corresponding to the optimal finished parameter as the final manufacturing parameter specifically includes:

sorting at least two finished product parameters in each of the data files according to an acquisition time or acquisition sequence of the data collector to form a finished product parameter data groups which are sequentially numbered, and sorting each manufacturing parameter according to the execution time or sequence to form manufacturing parameter data groups which are sequentially numbered.

associating the finished product parameter data groups with the manufacturing parameter data groups having the same number or sequence to form several associated data packets;

selecting the optimal finished product parameter in the finished product parameter data groups according to the calculation rule by the main platform of the management platform; and packaging and sending an associated data packet corresponding to the optimal finished product parameter to the service platform.

Based on the above IoT technical scheme, the selecting the optimal finished product parameter in the finished product parameter data groups according to the calculation rule by the main platform of the management platform specifically includes:

presetting an ideal finished product parameter, subtracting all finished product parameters in the finished product parameter data groups from the ideal finished product parameter in turn, respectively, obtaining a finished product parameter with the smallest difference from the ideal finished product parameter as the optimal finished product parameter in current different configuration files, and packaging and sending the associated data packet corresponding to the optimal finished product parameter to the service platform; and when the main production line device re-executes manufacturing according to another group of different configuration files, by the main platform of the management platform, obtaining an optimal finished product parameter for the another group of different configuration files in the same subtraction operation modesubtracting the optimal finished product parameter for the another group of different configuration files and the optimal finished product parameter for the previous group of configuration files with the ideal finished product parameter, obtaining a finished product parameter with the smallest difference from the ideal finished product parameter as an optimal finished product parameter in the current two groups of different configuration files, and packaging and sending an associated data package corresponding to the optimal finished product parameter to the service platform.

The present disclosure also provides a control method of an IIoT with a dual independent platform based on the above IIoT with the dual independent platform. The IIoT with the dual independent platform includes user platform, service platform, management platform, sensor network platform and object platform that interact in turn.

The service platform adopts centralized layout, and the management platform and sensor network platform adopt independent layout. The centralized layout means that the service platform uniformly receives data, processes data and sends data. The independent layout refers to that the management platform or sensor network platform adopts different platforms for storage, processing and/or transmission of data from different object platforms.

The control method includes the following steps.

The object platform includes a main production line device and at least one sub-production line devices of the same type as the main production line device. The main production line device and several sub-production line devices are equipped with data collectors.

When the main production line device performs manufacturing according to the different configuration files at different execution times, the data collector of the main production line device collects the finished product parameters of the main production line device under the control of different configuration files in unit time, and transmits the finished product parameters to the main platform of the sensor network platform. The different configuration files include at least two manufacturing parameters of the same type and different values.

The main platform of the sensor network platform converts the finished product parameters into data files that can be recognized by the management platform, and sends the data files to the main platform of the management platform.

The main platform of the management platform integrates the data files with the corresponding manufacturing parameters, selects an optimal finished product parameter according to a calculation rule, and packages and sends the manufacturing parameters corresponding to the optimal finished product parameter to the service platform as the final manufacturing parameters;

The service platform receives the final manufacturing parameters and stores them. When the user platform sends an instruction to execute the override manufacturing parameters, the service platform sends the final manufacturing parameters to at least one sub-platform of the management platform, Each sub-platform of at least one sub platform of the management platform stores and processes the final manufacturing parameters and sends them to the sub platform of the corresponding sensor network platform;

Each sub-platform of the sensor network platform receives the final manufacturing parameters, converts them into configuration files and sends them to the corresponding sub-production line device;

Each sub-production line device performs manufacturing according to the received configuration files.

Based on the above control methods, the different configuration files of the main production line device are acquired by the following manner that:

when the service platform receives the instruction from the user platform to change the manufacturing parameters, the service platform sends the modification instruction to the main platform of the management platform;

the main platform of the management platform receives the modification instruction, retrieves the pre-stored parameter data packets, and transmits the parameter data packets to the main platform of the corresponding sensor network platform; the parameter data packet comprising at least two manufacturing parameters of the same type with different values and different execution times corresponding to different manufacturing parameters;

the main platform of the sensor network platform receives the parameter data packet, sorts the at least two manufacturing parameters of the parameter data packet according to the order of the execution times to form at least two configuration files, and according to the different execution times, sends the configuration files at the corresponding execution times to the main production line device.

Compared with the prior art, the beneficial effects of some embodiments of the application are as follows: the industrial Internet of things with the dual independent platform and its control method of some embodiments of the disclosure build the Internet of things based on the five platform structure, in which the sensor network platform and the management platform are arranged independently, and each corresponding platform includes at least one independent sub-platform. Thus, independent sensor network platform and management platform can be adopted for each production line device to form independent data processing and transmission channels, reduce the data processing and transmission capacity of each platform, and reduce the computing pressure of a single platform of the entire Internet of things. All sensor network platforms and management platforms can be regulated and controlled through a centrally arranged service platform, this enables the service platform to better control the Internet of things.

When some of the embodiments of the present disclosure are used, combined with the IIoT with dual independent platform and its control methods, through the established main production line device, the main platform of the sensor network platform and the main platform of the management platform as the optimization system of manufacturing parameters, and through the main production line device to execute different manufacturing parameters to obtain the corresponding finished product parameters, select the corresponding manufacturing parameters with the optimal finished product parameters as the manufacturing parameters of other sub-production line devices for coverage and replacement, so that all production line device can use the optimal manufacturing parameters for intelligent manufacturing through continuous updating and coverage, which can not only simplify the process and time of parameter screening and coverage, but also not too much affect the manufacturing operation of sub-production line device. The quality of finished products of all production line devices is improved, and the quality of all production line devices and finished products can be monitored at the same time, so as to facilitate the intelligent control of all production line device.

BRIEF DESCRIPTION OF THE DRAWINGS

The attached figures described here are used to provide further understanding of the embodiments of the present disclosure, which constitutes part of the present disclosure, which does not constitute a limitation of the embodiments of the present disclosure. In the drawings:

FIG. 2 is a flowchart for a control method of the IIoT with the dual independent platform;

FIG. 3 is an exemplary flowchart of a process for determining target manufacturing parameters according to some embodiments of the present disclosure;

DETAILED DESCRIPTION

In order to make the purpose, technical scheme and advantages of the present disclosure clearer, the present disclosure is further described in detail below in combination with the embodiments and drawings. The schematic embodiment and description of the present disclosure are only used to explain the present disclosure and are not used as a limitation of the present disclosure. As used herein, the singular forms "a," "an," and "the" may be intended to include the plural forms as well, unless the context clearly indicates otherwise; and the plural forms may be intended to include the singular forms as well, unless the context clearly indicates otherwise.

The first embodiment of the present disclosure aims to provide an industrial IoT (IIoT) with dual independent platform. The IIoT with a dual independent platform uses the five platforms IoT technology, e.g., a sensor network platform and a management platform that form the dual independent platform, and a centralized service platform, which can not only realize the classified transmission and processing of data, but also realize the overall control of data. The IIoT with the dual independent platform can be widely used in intelligent production lines or intelligent assembly lines in various manufacturing industries, such as medicine, food, mechanical device, electronic device and so on. The IIoT with the dual independent platform has many characteristics, such as clear classification for data transmission, low operation cost of each platform and easy data control.

Figure 1:
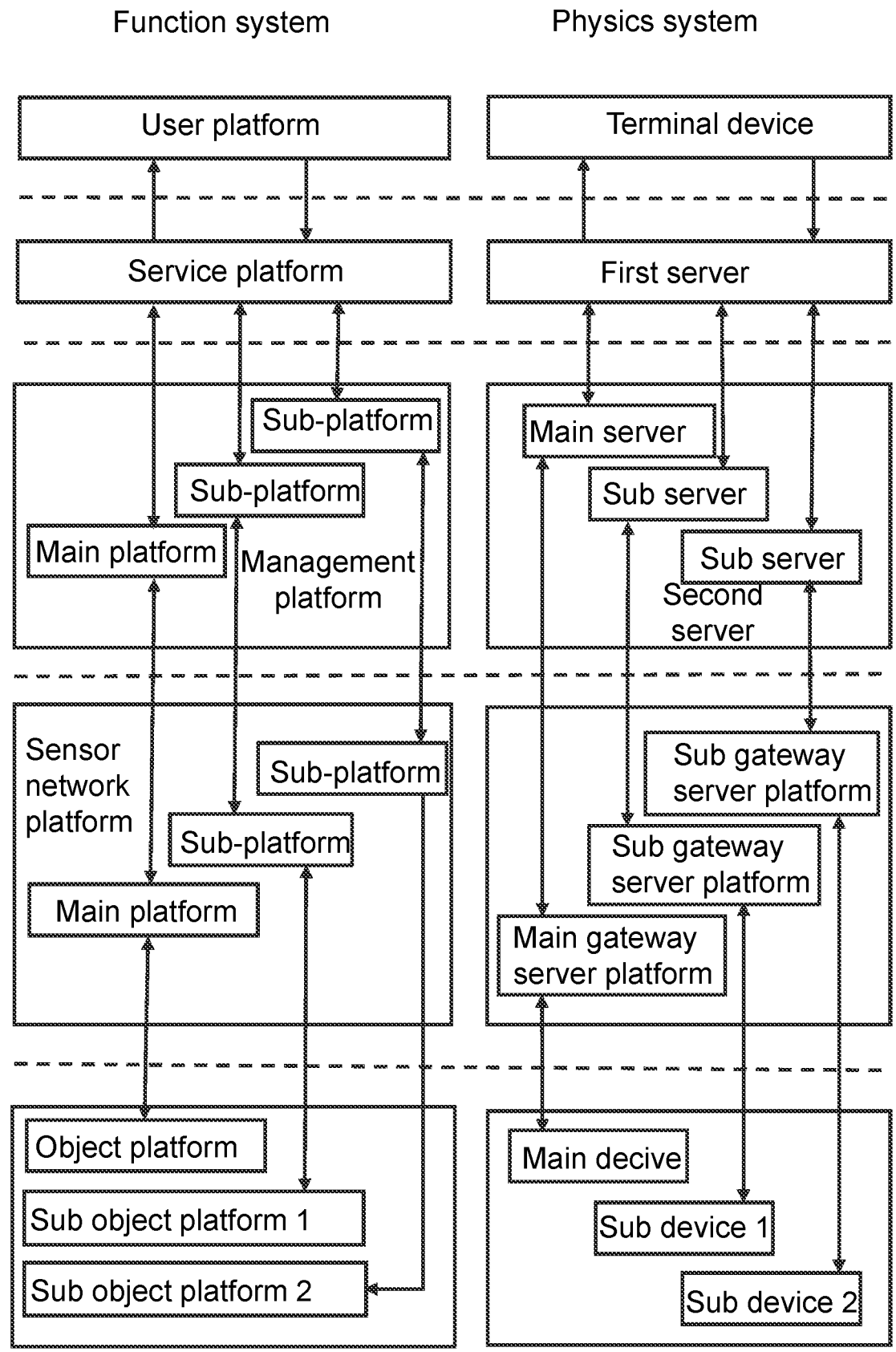
FIG. 1 is schematic diagram illustrating a structural framework of IIoT with a dual independent platform.

As shown in FIG. 1, the IIoT with the dual independent platform includes a user platform, a service platform, a management platform, a sensor network platform and an object platform.

The service platform adopts centralized layout, and the management platform and sensor network platform adopt independent layout. The centralized layout refers to the uniformly receiving data, processing data, and sending data. The independent layout refers to the data storage, data processing and/or data transmission of different platforms on the management platform or sensor network platform.

The object platform includes a main production line device and at least one sub-production line device of the same type as the main production line device. The main production line device and the at least one sub-production line device are equipped with data collectors.

When the main production line device performs manufacturing according to different configuration files at different execution times, the data collector of the main production line device collects the finished product parameters of the main production line device under the control of different configuration files in unit time, and transmits the finished product parameters to the main platform of the sensor network platform. The different configuration files include at least two manufacturing parameters of the same type but having different values.

The main platform of the sensor network platform converts the finished product parameters into data files that can be recognized by the management platform, and sends the data files to the main platform of the management platform.

The main platform of the management platform integrates the data files with the corresponding manufacturing parameters, selects the optimal finished product parameters according to the calculation rules, and packages and sends manufacturing parameters corresponding to the optimal finished product parameters as final manufacturing parameters to the service platform.

The service platform receives and stores the final manufacturing parameters, when the user platform sends an instruction of executing the covering manufacturing parameters, the service platform sends the final manufacturing parameters to a plurality of sub-platforms of the management platform.

Each of the sub-platforms of the management platform stores and processes the final manufacturing parameters and then sends them to a corresponding sub-platform of the sensor network platform.

Each of the sub-platforms of the sensor network platform receives the final manufacturing parameters, converts them into configuration files and sends them to corresponding sub-production line devices.

Each of the sub-production line devices is manufactured according to the received configuration files.

As an existing IoT architecture, the user platform is configured as terminal devices and interacts with users. The service platform is configured as the first server, receives instructions of the user platform and transmits them to the management platform, extracts information required to process the user platform from the management platform, and transmits the information to the user platform. The management platform is configured as the second server, controls the operation of the object platform, and receives the feedback data of the object platform. The sensor network platform is configured as a communication network and a gateway for the interaction between the object platform and the management platform. The object platform is configured as a production line device and a data collector that performs manufacturing.

In the prior art, when there are a large number of production line devices of the same type, the production line devices of the same type often perform manufacturing operations according to their preset manufacturing parameters. In practical application, when each production line device performs manufacturing under the control of manufacturing parameters, the finished product quality of each production line device is different due to different manufacturing parameters, causing that some production line devices of the same type have high quality of finished products and some has low quality of finished products, which is not conducive to high-quality batch manufacturing requirements. In order to further improve the quality of the finished products for the production line dives with low quality of the finished products, it is necessary to replace the parameters of multiple production line devices, respectively, which is not only time-consuming and laborious, but also the parameter replacement of multiple production line devices cannot be carried out at the same time, making some production line devices wait for a long time to update. When updating the data, the new manufacturing parameters used to cover the original manufacturing parameters can only be calculated manually or extracted from the manufacturing parameters with the best quality of a finished product, which is not the optimal manufacturing parameters for the production line devices in the actual manufacturing. Thus, the maximization and comprehensive improvement of the finished product quality cannot be achieved even if it takes manpower, material resources and time to complete the parameter replacement.

The IIoT with a dual independent platform of the present disclosure is constructed based on a five platform structure, in which the sensor network platform and management platform are arranged independently, each of which includes a plurality of independent sub-platforms, so that the independent sensor network platform and management platform can be adopted for each production line device to form independent data processing channel and transmission channel, so as to reduce the data processing capacity and transmission capacity of each platform, reduce the computing pressure of a single platform of the whole IoT, and uniformly regulate all sensor network platforms and management platforms through the centrally arranged service platform, so that the service platform can better manage and control the IoT.

As a result, the IoT with the dual independent platform of the present disclosure is used as a preferred system for manufacturing parameters through the main production line device, the main platform of the sensor network platform, and the main platform of the management platform. The main production line devices execute different manufacturing parameters to obtain the corresponding finished product parameters, and select the corresponding manufacturing parameters with the optimal finished product parameters as the manufacturing parameters of other sub-production line devices for uniform coverage and replacement at the same time or at different times. Thus, all production line devices can use the optimal manufacturing parameters for intelligent manufacturing through continuous updating and coverage. Excellent manufacturing parameters for intelligent manufacturing can not only simplify the process and time of parameter screening and coverage, but also may not affect the manufacturing operation of the sub-production line device too much, maximize the quality of all production line devices, and at the same time, the quality of all production line devices and its finished products can be monitored, which facilitates the intelligent management and control of all production line devices.

It should be noted that the user platform in this embodiment can be desktop computer, tablet computer, notebook computer, mobile phone or other electronic devices that can realize data processing and data communication, which is not limited thereto. In a specific application, the first server and the second server can use a single server, or the server cluster can also be used here. It should be understood that the data processing process mentioned in the embodiments can be processed by the processor of the server, and the data stored in the server can be stored on the storage device of the server, such as hard disk and other memory. In specific applications, the sensor network platform can adopt multiple groups of gateway servers or multiple groups of intelligent routers, which are not limited here. It should be understood that the data processing process mentioned in the embodiments of the present application can be processed by the processor of the gateway server, and the data stored in the gateway server can be stored on the storage device of the gateway server, such as hard disk, SSD and other memories.

It is further explained that in this industrial IoT with the dual independent platform (also referred to as dual independent platform industrial IoT), the sensor network platform and management platform adopt multiple (the same number) sub-platforms to form an independent layout, while the multiple sub-platforms of the two platforms form a one-to-one corresponding parent-child relationship. In the actual application, each production line device corresponds to a sub-platform of the sensor network platform, so that the separate data processing, transmission and storage of different production line devices can be realized. It not only reduces the overall data processing, transmission and storage capacity of the sensor network platform and management platform, but also carries out the data of different production line devices separately, which can also avoid data errors, clear data sources, and ensure the independent safety control of production line devices. The centralized layout of the service platform can ensure the unified coordination and management of all production line devices.

In some embodiments, the production line device is the various types of production line device relied on the product manufacturing in the production line. Taking the mechanical product as an example, the production line device can be a variety of smart machine processing devices such as smart lathes, smart milling machines, and smart plans. It can be a variety of modified device such as intelligent ignition device, intelligent quenching device, smart coating device, etc. Correspondingly, its manufacturing parameters are parameters set by the production line device to achieve manufacturing, such as the car knife route parameters of the lathe, the recovery temperature of the recovery device, and the coating amount of the coating device. The finished product parameter is the parameter value of the finished product made by the production line device according to the manufacturing parameter under the influence of the manufacturing parameter, such as, the size parameters of the finished product formed by the lathe under the control of the turning tool path parameters, the toughness value of the finished product formed by the tempering equipment under the control of the tempering temperature, and the thickness of the finished product formed by the coating equipment under the control of the coating amount, etc. Correspondingly, the data collector are various types of data acquisition device that collects corresponding finished parameters, such as obtaining the size of the finished product, the tough tester with the toughness of the finished toughness, and the coating thickness measurement instrument with the thickness of the finished coating. It should be noted that for different manufacturing parameters, there will be different finished product parameters and data collectors. Therefore, in actual application, the manufacturing parameters can be determined first, and then the corresponding finished parameter type and data collector type can be determined.

In the prior art, when it is necessary to update or optimize the parameters of the production line device, better manufacturing parameters are generally obtained through screening or calculation. Both the calculation amount and screening amount are extremely complex and time-consuming, and the obtained manufacturing parameters are not necessarily the optimal manufacturing parameters in the practical application of the production line device, which makes it difficult to achieve how to quickly obtain the optimal manufacturing parameters in the actual production.

Based on this, in the present disclosure, by setting the main production line device, the main platform of the sensor network platform and the main platform of the management platform, as the screening and optimization system of manufacturing parameters, can execute different manufacturing parameters to obtain different finished product parameters, and obtain the optimal manufacturing parameter among several manufacturing parameters through screening, so as to realize the intelligent optimization and intelligent screening of manufacturing parameters. Specifically:

When the service platform receives the instruction from the user platform to change the manufacturing parameters, the service platform sends the modification instruction to the main platform of the management platform.

The main platform of the management platform receives the modification instruction, retrieves the pre-stored parameter data packet, and transmits the parameter data packet to the corresponding main platform of the sensor network platform. The parameter data packet includes a plurality of manufacturing parameters of the same type but with different values and different execution times corresponding to different manufacturing parameters.

The main platform of the sensor network platform receives the parameter data packet, sorts a plurality of manufacturing parameters in the parameter data packet according to the order of execution times, and forms a plurality of configuration files. The main platform of the sensor network platform sends the configuration files corresponding to the execution times to the main production line device according to different execution times.

It should be noted that the pre-stored parameter data package may be several manufacturing parameters obtained through screening or calculation, or several manufacturing parameters set and selected by the producer based on the ideal state or expected state according to the actual production. Further, the manufacturing parameters can be a fixed value. Of course, the manufacturing parameters of some devices cannot be accurately fixed as a certain value, mostly in a small range. For example, the manufacturing parameters of tempering device are mostly in the temperature range, such as 200-220° C. Therefore, in some embodiments, the manufacturing parameters can also be the interval value of a certain range.

In the prior art, when the parameter data package involves multiple manufacturing parameters, the main production line device may take a long time to complete, which will lead to the failure of other sub-production line devices to quickly update the manufacturing parameters, and the optimal manufacturing parameters may be obtained only after the main platform of the management platform processes all the finished product parameters, costing a long cycle. After obtaining some preferred manufacturing parameters, it is also unable to update the parameters of the sub-production line device in time and maximize the finished product quality of the sub-production line device.

Based on this, the IIoT with a dual independent platform of the present disclosure further optimizes the parameter data packet, specifically:

There are one or more groups of parameter data packets.

When the parameter data packet is multiple groups, the modification instruction includes at least the extraction time or extraction time interval of each group of parameter data packets.

The main platform of the management platform successively extracts the corresponding groups of the parameter data packets according to the extraction time or extraction time interval.

By dividing relatively more manufacturing parameters into multiple groups, when each group of configuration files is completed, the obtained optimal manufacturing parameter may be used for parameter update first, and the finished product quality of sub-production line devices may be improved without a long cycle.

In some embodiments, in order to ensure the interval time and data processing time of different manufacturing parameters, when different manufacturing parameters are required to participate in manufacturing at different execution times, different manufacturing parameters can be controlled to execute at different times by adding the execution time to the manufacturing parameters, specifically in the following ways:

When an instruction of covering the manufacturing parameters contains the execution time, the sub-platform of the management platform may write the execution time into the corresponding final manufacturing parameters.

After receiving the final manufacturing parameters, the sub-platform of the sensor network platform extracts the execution time, converts the final manufacturing parameters into configuration files, and sends the configuration files to the corresponding sub-production line device according to the execution time.

In some embodiments, the main platform of the management platform integrates the data files with the corresponding manufacturing parameters, selects the optimal finished product parameter (or optimal finished product parameters) according to the calculation rule, and packages and sends the manufacturing parameters corresponding to the optimal finished product parameter to the service platform as the final manufacturing parameters. Specifically:

Multiple finished product parameters in the data file are sorted according to the acquisition time or acquisition sequence of the data collector to form sequentially numbered finished product parameter data groups, and each manufacturing parameter are sorted according to the execution time or sequence to form sequentially numbered manufacturing parameter data groups A plurality of associated data packets are formed by associating the finished product parameter data groups with the manufacturing parameter data groups having the same number or sequence.

The main platform of the management platform selects the optimal finished product parameter in the finished product parameter data groups according to the calculation rule.

The main platform of the management platform packages and sends the associated data package corresponding to the optimal finished product parameter to the service platform.

In some embodiments, the step that the main platform of the management platform selects the optimal finished product parameters in the finished product parameter data group according to the calculation rules specifically includes the following steps.

The main platform of the management platform is preset with ideal finished product parameter, all finished product parameters in the finished product parameter data group are subtracted from the ideal finished product parameter in turn, the finished product parameters with the smallest difference from the ideal finished product parameter are obtained as the optimal finished product parameter under different current configuration files, and the corresponding associated data packets are packaged and sent to the service platform.

When the main production line device performs manufacturing again according to another group of different configuration files, the main platform of the management platform obtains an optimal finished product parameter for the another group of different configuration files in the same subtraction operation modesubtracts the optimal finished product parameter for the another group of different configuration files and the optimal finished product parameter for the previous group of configuration files with the ideal finished product parameter, obtains a finished product parameter with the smallest difference from the ideal finished product parameter as an optimal finished product parameter in the current two groups of different configuration files, and packages and sends an associated data package corresponding to the optimal finished product parameter to the service platform.

It should be noted that the ideal finished product parameter is the finished product parameters of the production line device in the ideal state or the best-finished product parameters expected by the producer, which should be better than (less likely equal) the finished product parameters in practical application.

As shown in FIG. 2, the second embodiment of the present disclosure aims to provide a control method of IIoT with a dual independent platform based on the above the IIoT with the dual independent platform. The IIoT with a dual independent platform includes user platform, service platform, management platform, sensor network platform, and object platform which are successively interactive.

The service platform adopts centralized layout, and the management platform and sensor network platform adopt independent layout. The centralized layout means that the service platform uniformly receives data, uniformly processes data and uniformly sends data. The independent layout means that the management platform or the sensor network platform adopts different platforms for storage, processing and/or transmission of data from different object platforms.

The control method of IIoT with the dual independent platform includes the following steps.

S1: The object platform includes a main production line device and at least one sub-production line devices of the same type as the main production line device, the main production line device and at least one sub-production line devices are equipped with data collectors.

S2: When the main production line device performs manufacturing according to different configuration files at different execution times, the data collector of the main production line device collects the finished product parameters of the main production line device under the control of different configuration files in unit time, and transmits the finished product parameters to the main platform of the sensor network platform. The different configuration files include at least two manufacturing parameters of the same type but having different values.

S3: The main platform of the sensor network platform converts the finished product parameters into data files that can be recognized by the management platform, and sends the data files to the main platform of the management platform;

S4: The main platform of the management platform integrates the data files with the corresponding manufacturing parameters, selects the optimal finished product parameter according to the calculation rule, and packages and sends the manufacturing parameters corresponding to the optimal finished product parameter to the service platform as the final manufacturing parameters;

S5: The service platform receives the final manufacturing parameters and stores them, and when the user platform sends an instruction of covering the manufacturing parameters, the service platform sends the final manufacturing parameters to at least one sub-platform of the management platform.

S6: Each sub-platform of at least one sub-platform of the management platform stores and processes the final manufacturing parameters and sends them to each corresponding sub-platform of the sensor network platform;

S7: Each sub-platform of the sensor network platform receives the final manufacturing parameters, converts them into configuration files and sends them to the each corresponding sub-production line device;

S8: Each sub-production line device performs manufacturing according to the received configuration files.

Among them, the acquisition methods of different configuration files of the main production line device are as follows:

When the service platform receives an instruction issued by the user platform to change the manufacturing parameter, the service platform sends a modification instruction to the main platform of the management platform.

The main platform of the management platform receives the modification instruction, retrieves the pre-stored parameter data packet, and transmits the parameter data packet to the main platform of the corresponding sensor network platform. The parameter data packet includes at least two manufacturing parameters with different values of the same type and different execution times corresponding to different manufacturing parameters.

The main platform of the sensor network platform receives the parameter data packet, sorts a plurality of manufacturing parameters in the parameter data packet according to the order of execution time, and forms a plurality of configuration files. The main platform of the sensor network platform sends the configuration files corresponding to the execution time to the main production line device according to different execution times.

The following describes the IIoT with dual independent platform and its control method by taking the automatic production line for mechanical workpiece processing as an example.

The production device on the automatic production line for machining mechanical workpiece include CNC machine tools. CNC machine tool, also known as computer numerical control machine tools, is an automatic machine tool equipped with program control system. The control system can logically process the programs with control codes or other symbolic instructions, decode them, express them in coded numbers, and input them to the NC device through the information carrier. After calculation and processing, the numerical control device can send various control signals to control the action of the machine tool, and automatically process the parts according to the shape and size required by the drawing.

Generally speaking, CNC machine tools can include processing program carrier, CNC device, servo and measurement feedback system and machine tool body.

The processing program carrier can store the parts processing program in a certain format and code on a program carrier, such as pore piercing paper belts, box tapes, soft disks, etc. The part processing program may include the relative motion path of the tool and workpiece on the machine tool, process parameters (such as feed rate, spindle speed, etc.) and auxiliary motion, etc. The processing program carrier can input the above-stored part processing program (also known as NC instruction) to the NC device through the input device of the NC machine tool.

Numerical control device is a position control system, which can interpolate the ideal motion trajectory according to the input data. The numerical control device may be composed of three basic parts: input unit, processing unit and output unit. The input unit can input the above numerical control instructions to the processing unit (also known as the numerical control unit), and there are different input units according to different program carriers. The input unit can include keyboard input, disk input, CAD/CAM (computer aided design and computer aided manufacturing, referred to as CAD/CAM), system direct communication input, direct NC input connected to the superior computer, etc., or any combination thereof. The processing unit can compile the above numerical control commands (or instructions) into information that can be recognized by the computer, gradually store and process them according to the provisions of the control program, and send position and speed instructions to a servo and measurement feedback system through the output unit. The output unit may be associated with the servo and measurement feedback system. The output unit can receive the output pulse of the arithmetic unit according to the command of the controller, and transmit the output pulse to the servo and measurement feedback system of each coordinate.

The servo and measurement feedback system can be used to realize the feed servo control and spindle servo control of NC machine tools. The servo and measuring feedback system can convert the command information received from the numerical control device into the linear displacement or angular displacement of the executive components of the machine tool body after power amplification and shaping.

The main body of the machine can include the mechanical part of various cutting and processing (also known as execution parts, executive components) automatically.

In addition, CNC machine tools can include auxiliary devices. Commonly used auxiliary devices can include various auxiliary devices such as pneumatic, hydraulic device, crumb device, cooling device, lubrication device, and rotating workbench and CNC divisions, protection, and lighting.

Generally, the machining process of mechanical workpiece can include the following processes: analyze drawings, determine machining parameters, cutting tools, etc., wherein machining parameters can include spindle speed, tool feed speed, cutting speed, etc.; clamping the workpiece raw materials and cutting tools, and determining the workpiece zero position; and inputting processing parameters into processing program, processing and finishing product inspection.

In some embodiments, the object platform may include at least two CNC machine tools. One of the CNC machine tools can be designated as the main CNC machine tool, and the remaining CNC machine tools can be designated as sub CNC machine tools. The main CNC machine tool can be used as screening and optimization device for manufacturing parameters.

The user platform can send instructions to the service platform to modify the manufacturing parameters of the main NC machine tool. The modified manufacturing parameters may include at least two sets of processing parameters and their corresponding execution time. Each group of machining parameters includes at least one of the spindle speed, tool feed speed and cutting speed. Each group of processing parameters corresponds to a group of finished products, and a group of finished products includes at least one processed finished product. After receiving, the service platform sends the modification instruction to the main platform of the management platform. The main platform of the management platform can receive the modification instruction, retrieve the pre-stored parameter data packets, and transmit the parameter data packets to the main platform of the corresponding sensor network platform. The main platform of the sensor network platform receives parameter data packets, sorts at least two manufacturing parameters in the parameter data packets according to the order of execution time, and forms at least two configuration files. The main platform of the sensor network platform sends the configuration files corresponding to the execution time to the main CNC machine tool according to different execution times. The CNC device of the main CNC machine tool can receive and process the above-mentioned configuration files, and ultimately enables the main body to automatically complete the processing procedure to obtain at least two groups of finished products.

When the main NC machine tool performs manufacturing according to different configuration files at different execution times, the data collector of the main NC machine tool collects the finished product parameters of the main NC machine tool under the control of different configuration files in a unit time, and transmits the finished product parameters to the main platform of the sensor network platform. The data collector of the main CNC machine tool can be configured as a CCD (charge coupled device) visual detector. CCD visual detector can measure the parameters of finished products and transmit the parameters to the main platform of the sensor network platform. Finished product parameters can include workpiece size, surface smoothness, etc.

The main platform of the sensor network platform converts the finished product parameters into data files that can be recognized by the management platform, and sends the data files to the main platform of the management platform. The main platform of the management platform integrates the data files with the corresponding manufacturing parameters, and selects the optimal finished product parameters in accordance with the computing rule (or calculation rule), and sends the manufacturing parameters corresponding to the optimal finished parameter as the final manufacturing parameter to send to the service platform. The service platform receives and stores the final manufacturing parameters. When the user platform sends an instruction to cover manufacturing parameters, the service platform sends the final manufacturing parameters to at least one sub-platform of the management platform. Each sub-platform of the management platform corresponds to a sub-platform of the sensor network platform and a sub-CNC machine tool.

Each sub-platform of the management platform stores and processes the final manufacturing parameters and sends them to the sub-platform of the corresponding sensor network platform. Each sub-platform of the sensor network platform receives the final manufacturing parameters, converts them into configuration files and sends them to the corresponding sub-CNC machine tools. Each sub-CNC machine performs manufacturing according to the received configuration files.

FIG. 3 is an exemplary flowchart of a process for determining target manufacturing parameters according to some embodiments of the present specification. As shown in FIG. 3, the process 300 includes the following steps. In some embodiments, the process 300 may be executed by the main platform of the management platform.

Figure 4:
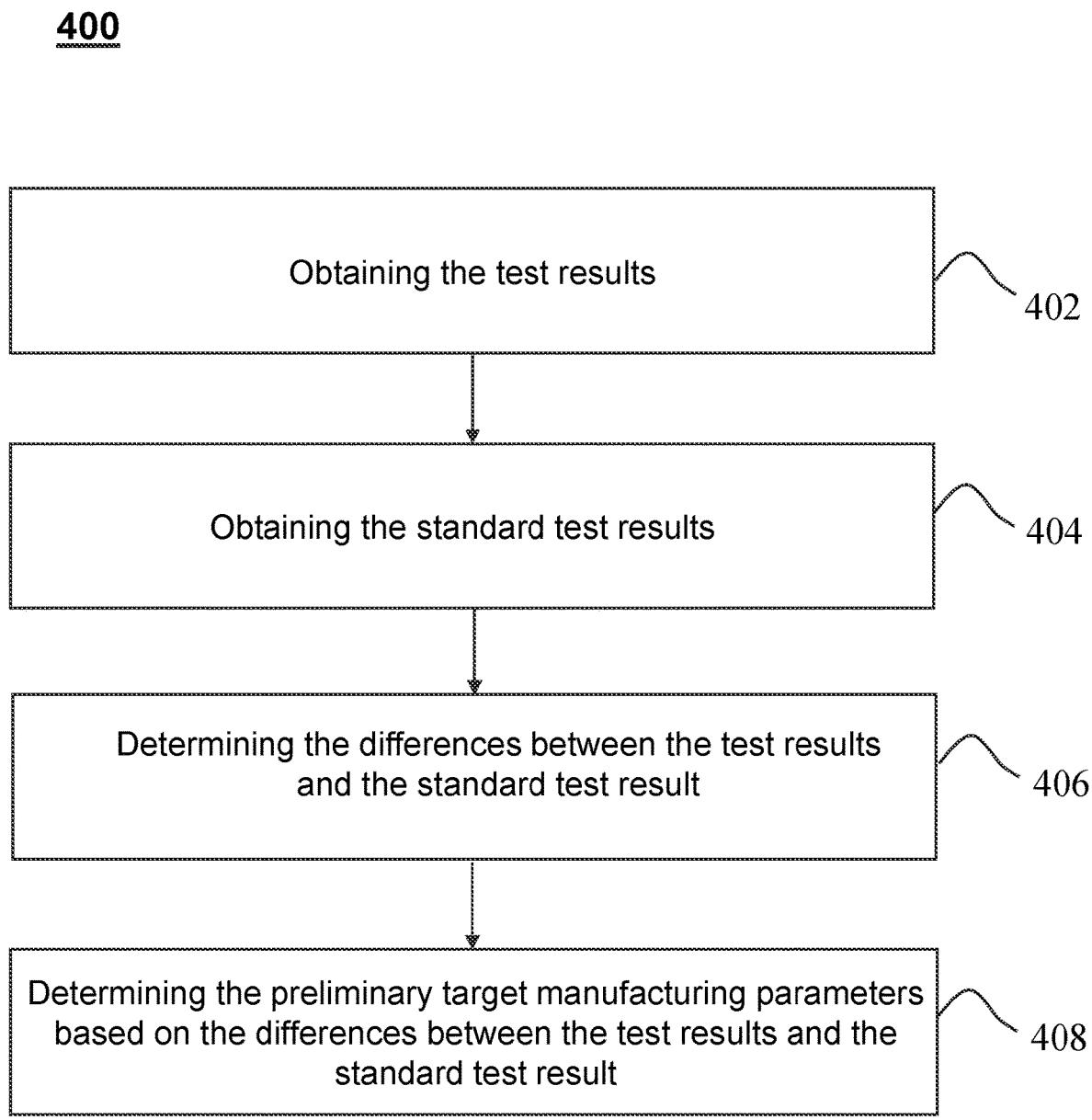
FIG. 4 is an exemplary flowchart of a process for determining preliminary target manufacturing parameters according to some embodiments of the present disclosure.

Step302, the main platform of the management platform can obtain the test results of the finished products when the main production line device performs manufacturing (or processing) according to the different configuration files at the different execution times. The test results include at least one test item, and the test results correspond to the parameters of the finished products. The configuration file can be a file that contains or can be converted into the processing parameters (also known as manufacturing parameters) of the production line, and the production line device can carry out production operations according to the above processing parameters. Taking the production line of leaf drying in the tobacco processing as an example (the production lines in FIG. 3 and FIG. 4 are all use this production line example), the processing parameters can include the opening degree of the steam valve, return air temperature, moisture content of incoming material, cylinder wall temperature, incoming material flow, etc. Each configuration file can correspond to a group of finished products, and a group of finished products can correspond to at least one finished product or a batch of finished products. In some embodiments, the above different configuration files may include at least two configuration files, and the test results may include the test results of at least two groups of finished products. The test results of each group of finished products may include the measurement results of the finished parameters. In some embodiments, the finished product parameters may include a moisture content of the discharged material, an outlet temperature, etc.

The main production device of the object platform (such as the main tobacco leaf dryer) can produce according to the configuration files, and the data collector configured by the main production device is used to obtain the test results. In some embodiments, the data collector configured for the main tobacco leaf dryer may include a moisture content meter (for measuring the moisture content of the discharged material), a temperature sensor (for measuring the outlet temperature), or other instruments that can measure the test results.

Step 304, the main platform of the management platform can determine the preliminary target manufacturing parameters based on the test results. The test results include two groups of test results of at least two groups of finished products. The main platform of the management platform can select a group of optimal finished products from at least two groups of products, and obtain the processing parameters (also known as manufacturing parameters) corresponding to the group of optimal finished products. The processing parameters corresponding to the group of optimal finished products can be specified as the preliminary target manufacturing parameters. In some embodiments, the main platform of the management platform may select the group of optimal finished products from at least two groups of products according to the standard product requirements. The standard product requirements may include standard products required by users, standard products required by industrial standards or national standards, standard products determined by historical qualified products, historical best products, etc. For the determination of preliminary target manufacturing parameters, see the description in FIG. 4. In some embodiments, the main platform of the management platform may send preliminary target manufacturing parameters to the service platform.

Step 306, the service platform can adjust the preliminary target manufacturing parameters, determine the target manufacturing parameters corresponding to the main production line device and the at least one sub-production line device respectively, and the target manufacturing parameters are included in the configuration files. The target manufacturing parameters are closer to manufacturing parameters corresponding to the standard products than the preliminary target manufacturing parameters.

The target manufacturing parameters can be temporarily stored in the service platform after being determined. When the user platform sends the covering manufacturing parameter instruction, the service platform can send the target manufacturing parameters to the main platform and at least one sub-platform of the management platform, and then transmit them to the main production device and at least one sub-production device of the object platform through the main platform and at least one sub-platform of the sensor network platform. The adjustment may be to modify the preliminary target manufacturing parameters within the preset range. In some embodiments, the service platform may adjust the preliminary target manufacturing parameters according to the prediction model based on the standard product requirements. In some embodiments, the service platform may adjust the preliminary target manufacturing parameters according to the user's input. For the adjustments to the preliminary target manufacturing parameters, see the description of FIG. 5 for details.

By adjusting the preliminary target manufacturing parameters corresponding to the optimal finished products, the target manufacturing parameters are closer to the manufacturing parameters corresponding to the standard products than the preliminary target manufacturing parameters, and the finished products produced by the production line device are closer to the requirements of the standard products, so as to improve the quality or qualification rate of the finished products.

FIG. 4 is an exemplary flowchart of a process for determining preliminary target manufacturing parameters according to some embodiments of the present disclosure. As shown in FIG. 4, the process 400 includes the following steps. In some embodiments, the process 400 may be executed by the main platform of the management platform.

Step 402, the main platform of the management platform can obtain the test results. As described in step 302, the test results may include the test results of at least two groups of finished products. Each group of finished products can correspond to at least one finished product or a batch of finished products. Each group of finished products can correspond to a configuration file. The test results of each composition may include the measurement results of the finished parameters. In some embodiments, the finished product parameters may include a moisture content of the discharged material, an outlet temperature, etc. In some embodiments, the test results may be represented by at least one value. In some embodiments, the test results may be expressed as vectors. In some embodiments, different weights may be assigned to different finished product parameters.

Step 404, the main platform of the management platform can obtain the standard test results. The standard test results correspond to the test results of the above finished products, which can be expressed in at least one value or in a vector, and different weights can be assigned to the parameters of the finished products. The standard test results can be stored in the main platform of the management platform in advance. The exemplary standard test results are as follows: the standard measurement result of discharge moisture content is 13%, and the standard measurement result of outlet temperature is 63° C.

In some embodiments, a standard test result may be an ideal test result for a finished product. In some embodiments, the standard test result may be a test result of a standard finished product. In some embodiments, considering the difference between actual production and theoretical requirements, the main platform of the management platform can determine the standard test results based on the actual situation. In some embodiments, the main platform of the management platform can cluster the test result vectors corresponding to the historical finished products (products of the same type as the finished products) to obtain a plurality of clusters, then determine a cluster corresponding to a cluster center closest to a vector corresponding to the ideal test result, and determine the standard test results based on the cluster.

The cluster is determined by the following process. For each cluster in multiple clusters, the main platform of the management platform can perform average or weighted average of the distances between the test result vectors in the cluster and the ideal test result vector. The weight of the weighted average is calculated by the distances between test result vectors and the ideal test result vector. For example, if the total distance from each test result vector to the ideal test result vector in the cluster is L, the distance from the $i^{th}$ test result vector to the ideal test result vector is Li, and the total number of test result vectors in the cluster is n, then the weight value of each test result vector is $(1-Li/L)/(n-1)$. The main platform of the management platform can select a cluster with the lowest average value or weighted average value as the cluster used to determine the standard test results.

The main platform of the management platform can determine the standard test result based on the selected cluster. The main platform of the management platform can take the average or weighted average of all test result vectors in the cluster, obtain an average or weighted average vector as the standard test result vector, and obtain the standard test result according to the standard test result vector. The weight of the weighted average is calculated by the distances between the test result vectors and the ideal test result vector. The calculation method is the same as that in the previous paragraph.

Step 406, the main platform of the management platform can determine the differences between the test results and the standard test result. In some embodiments, the differences may be the distances between the test result vectors and the standard test result vector. In some embodiments, the differences may be differences or weight differences between test result values and a standard test result value. For test results containing two or more measurement parameters, the main platform of the management platform can assign different weights to different measurement parameter differences. The weights can be pre-set by the user.

Step 408, the main platform of the management platform can determine the preliminary target manufacturing parameters based on the differences between the test results and the standard test result. In some embodiments, the main platform of the management platform can select the finished product manufacturing parameters (also known as processing parameters) corresponding to the test results with the smallest difference from the standard test result as the preliminary target manufacturing parameters. In some embodiments, the main platform of the management platform determines one or more test results according to a preset condition. The preset condition may be that a distance from a test result vector to the standard test result vector is less than a preset threshold. The main platform of the management platform can fuse the finished product manufacturing parameters corresponding to one or more of the above test results to determine the preliminary target manufacturing parameters. In some embodiments, the main platform of the management platform can average the processing parameters corresponding to the test results whose differences meet the preset condition. In some embodiments, the main platform of the management platform can perform the weighted average of the processing parameters corresponding to the test results whose differences meet the preset condition. The weight of the weighted average is calculated by the distances between the test result vectors and the standard test result vector, and the calculation method is the same as that in step 404.

The preliminary target manufacturing parameters can be determined through the differences between the test results of multiple groups of finished products and the standard test result, which can make the preliminary target manufacturing parameters closer to the manufacturing parameter corresponding to the standard test result.

Figure 5:
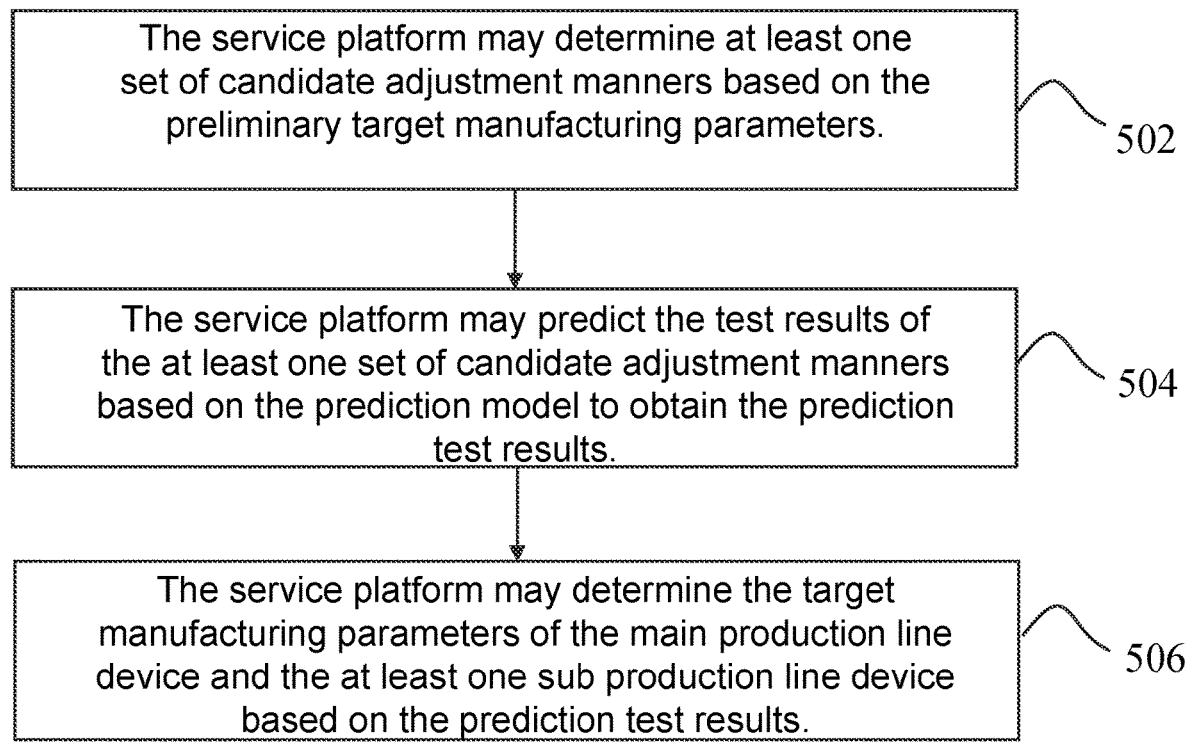
FIG. 5 is an exemplary flowchart of a process for determining preliminary target manufacturing parameters according to some embodiments of the present disclosure.

FIG. 5 is an exemplary flowchart of a process for determining preliminary target manufacturing parameters according to some embodiments of the present specification. As shown in FIG. 5, the process 500 includes the following steps. In some embodiments, the process 500 may be executed by a service platform.

In step 502, the service platform may determine at least one set of candidate adjustment manners based on the preliminary target manufacturing parameters. The adjustment manner can include modifying the preliminary target manufacturing parameters within a certain range. In some embodiments, after determining the adjustment range, the adjustment intervals and corresponding adjustment sets within the adjustment range can be determined. The adjustment intervals may be the same or different. The setting of adjustment intervals varies since the categories of manufacturing parameters are different. The service platform can adjust the preliminary target manufacturing parameters based on the adjustment range and adjustment intervals to determine the at least one set of candidate adjustment manners.

In some embodiments, the service platform may acquire a preset adjustment range according to a preset instruction of a user.

In some embodiments, the service platform can determine at least one set of candidate adjustment manners according to the differences between the test results corresponding to the preliminary target manufacturing parameters or the fusion test results and the standard test result. The difference may be the distances between the test result vectors or fusion test result vectors corresponding to the preliminary target manufacturing parameters and the standard test result vector, the numerical value differences between the test results or fusion test results corresponding to the preliminary target manufacturing parameters and the standard test result, or the weighted numerical differences between the test results or fusion test results corresponding to the preliminary target manufacturing parameters and the standard test result.

In some embodiments, the service platform can set the functional relationship between the adjustment range and the differences described above, and the relationship between the adjustment range and the differences described above is a positive correlation. The service platform can determine the adjustment range through the calculation results of the above function relationship. The function may be a linear function, a quadratic function, a cubic function, or an exponential function. For example, when the function is a linear function, the function relationship may be y=kl+a, where y represents the adjustment range, I represents the distance, and K and a are constants.

In some embodiments, the service platform may set a first threshold and a second threshold for the differences between the test results or the fusion test results and the standard test result. The first threshold is less than the second threshold. The threshold values can be preset in the service platform by the user, and the user can adjust the values at any time. Different differences may cause different adjustment ranges, and the larger the difference, the larger the adjustment range. For example, when a difference is less than the first threshold, the adjustment range can be 10% of the preliminary target manufacturing parameters; when the difference is greater than the first threshold and less than the second threshold, the adjustment range can be 20% of the preliminary target manufacturing parameters; when the difference is greater than the second threshold, the adjustment range can be 30% of the preliminary target manufacturing parameters. Taking the tempering temperature as an example, the preliminary target manufacturing parameter of tempering temperature is 118° C. and the adjustment interval is 0.5° C. When the difference is less than the first threshold, the adjustment range can be 11.8° C., and the adjustment manners can include 106.5° C., 107° C., 107.5° C. . . . 129° C., 129.5° C. When the difference is greater than the first threshold and less than the second threshold, the adjustment range can be 23.6° C., and the adjustment manners can include 94.5° C., 95° C., 95.5° C. . . . 141° C., 141.5° C. When the difference is greater than the second threshold, the adjustment range can be 35.4° C., and the adjustment method can include 83° C., 83.5° C., 84° C. . . . 152.5° C., 153° C.

Figure 6:
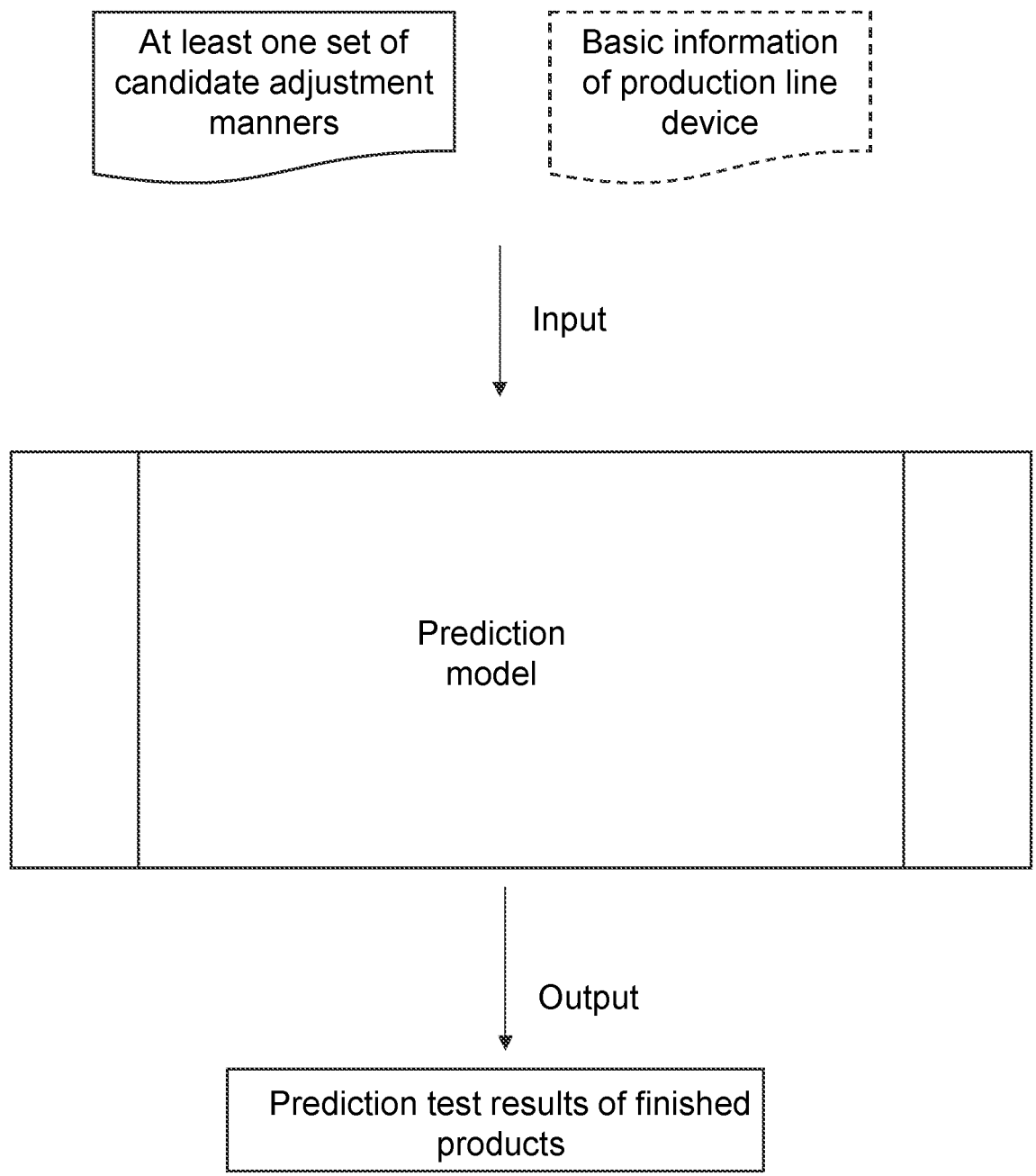
FIG. 6 is an exemplary block diagram of a prediction model shown according to some embodiments of the present disclosure.

Step 504, the service platform may predict the test results of the at least one set of candidate adjustment manners based on the prediction model to obtain the prediction test results. As shown in FIG. 6, in some embodiments, the input of the prediction model is a candidate adjustment manner, and the output is a finished product prediction test result. In some embodiments, the input of the prediction model also includes the basic situation of the production line device. The basic information of the production line device can include device model, device maintenance record, device failure reason, device failure times, device service time, etc.

The prediction model can be more accurate by inputting the basic information of the production line device.

In some embodiments, the prediction model may include a machine learning model. In some embodiments, the prediction model may include a neural network model. The prediction model can be obtained based on training samples.

In some embodiments, the training samples may be training data and training tags. The training data includes at least one set of historical adjustment manners of manufacturing parameters. The training tag includes historical finished product test results corresponding to at least one set of historical adjustment manners of manufacturing parameters. In some embodiments, the training data may also include historical basic information of a production line device used to produce historical finished products.

In some embodiments, the above training samples may be input to the initial prediction model for training to obtain the prediction model.

Step 506, the service platform may determine the target manufacturing parameters of the main production line device and the at least one sub-production line device based on the prediction test results. In some embodiments, for the target manufacturing parameters of the main production line device and at least one sub-production line device, the service platform can determine a set of target manufacturing parameters and apply them to all production line devices. In some embodiments, the service platform may determine a set of target manufacturing parameters for each of the main production line device and at least one sub-production line device, and apply them to the respective production line devices. In some embodiments, for all production line devices or a single production line device (when the input of the prediction model includes the basic situation (information) of the device), the service platform can determine the differences between the prediction test results and the standard test result, and take the preliminary manufacturing parameter of the candidate adjustment manners corresponding to the prediction test result with the smallest difference as the target manufacturing parameter. Through the prediction model, the target manufacturing parameters are filtered based on the prediction results of at least one group of candidate adjustment manners, which can make the filtered target manufacturing parameters closer to the manufacturing parameters corresponding to the standard test results.

It should be noted that the above description of relevant processes is only for example and explanation, and does not limit the scope of application of the present disclosure. It should be noted that the above description of relevant processes is only for example and explanation, and does not limit the scope of application of the present disclosure. However, these amendments and changes are still within the scope of the present disclosure.

Those of ordinary skill in the art can realize that the units and algorithm steps of each example described in conjunction with the embodiments disclosed herein can be implemented in electronic hardware, computer software, or a combination of the two. In order to clearly illustrate the interchangeability of hardware and software, the components and steps of each example have been generally described in terms of functions in the foregoing description. These functions are executed in hardware or software, depending on the specific application and design constraints of the technical solution. Professional and technical personnel can use different methods to implement the described functions on each specific application, but this implementation should not be considered to exceed the scope of the disclosure.

In several embodiments provided in this disclosure, the device and methods exposed should be implemented in other ways. For example, the embodiment of the device described above is only examples. For example, the division of the unit is only a logical function division. In practice, there can be another way to divide It can be integrated to another system, or some features can be ignored or not executed. Additionally, the coupling or direct coupling or communication connection between the displayed or discussed may be indirectly coupled or communication between some interfaces, devices or units, or is also electrically mechanically, mechanical or other forms.

The unit that is described as a separate part can be physical or not. The combination of electronic hardware, computer software, or the combination of the two. In order to clearly explain the interchangeability of the hardware and software, the composition and steps of each example have been described in general in the above description. These functions are executed in hardware or software, depending on the specific application and design constraints of the technical solution. Professional and technical personnel can use different methods to implement the described functions on each specific application, but this implementation should not be considered to exceed the scope of the disclosure.

In addition, each functional unit in each embodiment of the present invention can be integrated in one processing unit, or the physical existence of each unit alone, or two or more units integrated in one unit. The above-mentioned integrated units can be implemented in the form of hardware or the form of software functional units.

The integrated unit can be stored in a computer readable storage medium if implemented in the form of a software functional unit and is used as a stand-alone product. Based on this understanding, the technical solution of the present invention is essentially or contributed to existing technology, or all or part of the technical solution can be reflected in the form of software products. The computer software product is stored in a storage medium in a storage medium Among them, there are several instructions to enable a computer device (can be a personal computer, server, or grid device, etc.) to perform all or part of the methods described in each embodiment of the present invention. The aforementioned storage media include: USB flash disk, mobile hard disk, Read-Only Memory (ROM), Random Access Memory (RAM), magnetic disc or optical disc and other media that can store program codes.

The specific embodiments described above further detail the purpose, technical scheme and beneficial effects of the present disclosure. It should be understood that the above are only the specific embodiments of the present disclosure and are not used to limit the protection scope of the present disclosure. Any modification, equivalent replacement, improvement, etc. made within the spirit and principles of the present disclosure should be included in the protection scope of the present disclosure.

We claim:

1. A system of Industrial Internet of Things (IIoT) with a dual independent platform, comprising a user platform, a service platform, a management platform, a sensor network platform and an object platform which are interacted in sequence, wherein the service platform adopts centralized layout, and the management platform and the sensor network platform adopt independent layout;

the centralized layout means that the service platform uniformly receives data, processes the data and sends the data;

the independent layout means that the management platform or the sensor network platform adopts different platforms for storage, processing and/or transmission of data from different object platforms;

the object platform includes a main production line device and at least one sub-production line device of the same type as the main production line device, the main production line device and the at least one sub-production line device are configured with data collectors, respectively;

when the main production line device executes manufacturing according to different configuration files at different execution times, the data collector of the main production line device collects finished product parameters of the main production line device under control of the different configuration files in unit time and transmits the finished product parameters to a main platform of the sensor network platform, the different configuration files including at least two manufacturing parameters of the same type with different values;

the main platform of the sensor network platform converts the finished product parameters into data files that can be recognized by the management platform, and sends the data files to a main platform of the management platform;

the main platform of the management platform integrates the data files with the corresponding manufacturing parameters, selects an optimal finished product parameter according to a calculation rule, and packages and sends the manufacturing parameters corresponding to the optimal finished product parameter to the service platform as final manufacturing parameters;

the service platform receives the final manufacturing parameters and stores them, and when the user platform issues an instruction of executing covering manufacturing parameters, sends the final manufacturing parameters to at least one sub-platform of the management platform;

each of the at least one sub-platform of the management platform stores and processes the final manufacturing parameters and sends them to each corresponding sub-platform of the sensor network platform;

the each sub-platform of the sensor network platform receives the final manufacturing parameters, converts them into configuration files and sends them to each corresponding sub-production line device; and the each sub-production line device performs manufacturing according to the received configuration files.

2. The system of the IIoT with the dual independent platform according to claim 1, wherein the different configuration files of the main production line device are acquired by the following manner that: the service platform sends a modification instruction to the main platform of the management platform by the service platform when the service platform receives the instruction from the user platform to modify the manufacturing parameters; the main platform of the management platform receives the modification instruction, retrieves a pre-stored parameter data packet, and transmits the parameter data packet to the corresponding main platform of the sensor network platform; the parameter data packet including at least two manufacturing parameters of the same type with different values and different execution times corresponding to different manufacturing parameters; and the main platform of the sensor network platform receives the parameter data packet, sorts the at least two manufacturing parameters of the parameter data packet according to the order of the execution times to form at least two configuration files, and according to the different execution times, sends the configuration files at the corresponding execution times to the main production line device.

3. The system of the IIoT with the dual independent platform according to claim 2, wherein the parameter data packet is in the form of one or more groups; the modification instruction at least includes an extraction time or extraction time interval of each group of parameter data packets when the parameter data packet is in the form of multiple groups; and according to the extraction time or extraction time interval, the main platform of the management platform extracts successively the each corresponding group of parameter data packets.

4. The system of the IIoT with the dual independent platform according to claim 1, wherein the sub-platform of the management platform writes an execution time into the corresponding final manufacturing parameters when the instruction of executing the covering manufacturing parameters includes the execution time; and after receiving the final manufacturing parameters, the sub-platform of the sensor network platform extracts the execution time, converts the final manufacturing parameters into the configuration files, and sends the configuration files to the corresponding sub-production line device according to the execution time.

5. The system of the IIoT with the dual independent platform according to claim 1, wherein that the main platform of the management platform integrates the data files with the corresponding manufacturing parameters, selects an optimal finished product parameter according to a calculation rule, and packages and sends manufacturing parameters corresponding to the optimal finished product parameter to the service platform as final manufacturing parameters; calculation rule includes: sorting at least two finished product parameters in each of the data files according to an acquisition time or acquisition sequence of the data collector to form finished product parameter data groups which are sequentially numbered, and sorting each manufacturing parameter according to the execution time or sequence to form manufacturing parameter data groups which are sequentially numbered; associating the finished product parameter data groups with the manufacturing parameter data groups having the same number or sequence to form several associated data packets; selecting the optimal finished product parameter in the finished product parameter data groups according to the calculation rule by the main platform of the management platform; and packaging and sending an associated data packet corresponding to the optimal finished product parameter to the service platform.

6. The system of the IIoT with the dual independent platform according to claim 5, wherein selecting the optimal finished product parameter in the finished product parameter data groups according to the calculation rule by the main platform of the management platform includes: presetting an ideal finished product parameter, subtracting all finished product parameters in the finished product parameter data groups from the ideal finished product parameter in turn, respectively, obtaining a finished product parameter with the smallest difference from the ideal finished product parameter as the optimal finished product parameter in current different configuration files, and packaging and sending the associated data packet corresponding to the optimal finished product parameter to the service platform; and when the main production line device re-executes manufacturing according to another group of different configuration files, by the main platform of the management platform, obtaining an optimal finished product parameter for the another group of different configuration files in the same subtraction operation mode subtracting the optimal finished product parameter for the another group of different configuration files and the optimal finished product parameter for the previous group of configuration files with the ideal finished product parameter, obtaining a finished product parameter with the smallest difference from the ideal finished product parameter as an optimal finished product parameter in the current two groups of different configuration files, and packaging and sending an associated data package corresponding to the optimal finished product parameter to the service platform.

7. The system of the IIoT with the dual independent platform according to claim 1, wherein in order to integrate the data files with the corresponding manufacturing parameters and select the optimal finished product parameter according to the calculation rule, the main platform of the management platform further obtains test results of finished products manufactured by the main production line device at the different execution times according to the different configuration files, each of the test results including at least one test item, and the test results corresponding to the finished product parameters; and determines preliminary target manufacturing parameters based on the test results; and the service platform further adjusts preliminary target manufacturing parameters, and determines target manufacturing parameters corresponding to the main production line device and the at least one sub-production line device, respectively, the target manufacturing parameters being included in the configuration files.

8. The system of the IIoT with the dual independent platform according to claim 7, wherein in order to determine the preliminary target manufacturing parameters based on the test results, the main platform of the management platform further obtains standard test results; and determines the preliminary target manufacturing parameters based on differences between the test results and the standard test results.

9. The system of the IIoT with the dual independent platform according to claim 8, wherein in order to determine the preliminary target manufacturing parameters based on the differences between the test results and the standard test results, the main platform of the management platform further constructs test result vectors based on the test results, and constructs standard test result vectors based on the standard test results; and determines differences based on distances between the test result vectors and the standard test result vectors.

10. The system of the IIoT with the dual independent platform according to claim 7, wherein in order to adjust the preliminary target manufacturing parameters and determine the target manufacturing parameters corresponding to the main production line device and the at least one sub-production line device, respectively, the service platform further determines at least one set of candidate adjustment manners based on the preliminary target manufacturing parameters; predicts test results of the at least one set of candidate adjustment manners based on a prediction model to obtain prediction test results; and determines the target manufacturing parameters of the main production line device and the at least one sub-production line device based on the prediction test results.

11. A control method of Industrial Internet of Things (IIoT) with a dual independent platform, wherein the IIoT with the dual independent platform comprises a user platform, a service platform, a management platform, a sensor network platform and an object platform which are interacted in sequence; the service platform adopts centralized layout, and the management platform and the sensor network platform adopt independent layout; the centralized layout means that the service platform uniformly receives data, processes the data and sends the data; the independent layout means that the management platform or the sensor network platform adopts different platforms for storage, processing and/or transmission of data from different object platforms; the object platform includes a main production line device and at least one sub-production line device of the same type as the main production line device, the main production line device and the at least one sub-production line device are configured with data collectors, respectively; and the control method comprises:

when the main production line device performs manufacturing according to different configuration files at different execution times, collecting, by a data collector of the main production line device, finished product parameters of the main production line device under control of the different configuration files in unit time, and transmitting the finished product parameters to a main platform of the sensor network platform, wherein the different configuration files includes at least two manufacturing parameters of the same type with different values;

converting, by the main platform of the sensor network platform, the finished product parameters into data files that can be recognized by the management platform, and sends the data files to a main platform of the management platform;

integrating, by the main platform of the management platform, the data files with the corresponding manufacturing parameters, selecting an optimal finished product parameter according to a calculation rule, and packaging and sending manufacturing parameters corresponding to the optimal finished product parameter to the service platform as final manufacturing parameters;

receiving, by the service platform, the final manufacturing parameters and storing them, and when the user platform issues an instruction of executing covering manufacturing parameters, sending the final manufacturing parameters to at least one sub-platform of the management platform;

storing and processing, by each of the at least one sub-platform of the management platform, the final manufacturing parameters and sending them to each corresponding sub-platform of the sensor network platform;

receiving, by the each sub-platform of the sensor network platform, the final manufacturing parameters, converting them into configuration files and sending them to each corresponding sub-production line device; and performing, by the each sub-production line device, manufacturing according to the received configuration files.

12. The control method according to claim 11, wherein the different configuration files of the main production line device are acquired by the following manner that: the service platform sends a modification instruction to the main platform of the management platform by the service platform when the service platform receives the instruction from the user platform to modify the manufacturing parameters; the main platform of the management platform receives the modification instruction, retrieves a pre-stored parameter data packet, and transmits the parameter data packet to the corresponding main platform of the sensor network platform; the parameter data packet including at least two manufacturing parameters of the same type with different values and different execution times corresponding to different manufacturing parameters; and the main platform of the sensor network platform receives the parameter data packet, sorts the at least two manufacturing parameters of the parameter data packet according to the order of the execution times to form at least two configuration files, and according to the different execution times, sends the configuration files at the corresponding execution times to the main production line device.

13. The control method according to claim 12, wherein the parameter data packet is in the form of one or more groups; the modification instruction at least includes an extraction time or extraction time interval of each group of parameter data packets when the parameter data packet is in the form of multiple groups; and according to the extraction time or extraction time interval, the main platform of the management platform extracts successively the each corresponding group of parameter data packets.

14. The control method according to claim 11, wherein the control method further comprises: writing, by the sub-platform of the management platform, an execution time into the corresponding final manufacturing parameters when the instruction of executing the covering manufacturing parameters includes the execution time; after receiving the final manufacturing parameters, extracting the execution time, converting the final manufacturing parameters into the configuration files, and sending the configuration files to the corresponding sub-production line device according to the execution time by the sub-platform of the sensor network platform.

15. The control method according to the claim 11, wherein by the main platform of the management platform, integrating the data files with the corresponding manufacturing parameters, selecting the optimal finished product parameters according to the calculation rule, and packaging and sending the manufacturing parameters corresponding to the optimal finished product parameter to the service platform as final manufacturing parameters comprises: sorting at least two finished product parameters in each of the data files according to an acquisition time or acquisition sequence of the data collector to form finished product parameter data groups which are sequentially numbered, and sorting each manufacturing parameter according to the execution time or sequence to form manufacturing parameter data groups which are sequentially numbered; associating the finished product parameter data groups with the manufacturing parameter data groups having the same number or sequence to form several associated data packets; selecting the optimal finished product parameter in the finished product parameter data groups according to the calculation rule by the main platform of the management platform; and packaging and sending an associated data package corresponding to the optimal finished product parameter to the service platform.

16. The control method according to claim 15, wherein selecting the optimal finished product parameter in the finished product parameter data groups according to the calculation rule by the main platform of the management platform comprises: presetting an ideal finished product parameter, subtracting all finished product parameters in the finished product parameter data groups from the ideal finished product parameter in turn, respectively, obtaining a finished product parameter with the smallest difference from the ideal finished product parameter as the optimal finished product parameter in current different configuration files, and packaging and sending the associated data packets corresponding to the optimal finished product parameter to the service platform; and when the main production line device re-executes manufacturing according to another group of different configuration files, by the main platform of the management platform, obtaining an optimal finished product parameter for the another group of different configuration files in the same subtraction operation mode subtracting the optimal finished product parameter for the another group of different configuration files and the optimal finished product parameter for the previous group of configuration files with the ideal finished product parameter, obtaining a finished product parameter with the smallest difference from the ideal finished product parameter as an optimal finished product parameter in the current two groups of different configuration files, and packaging and sending an associated data package corresponding to the optimal finished product parameter to the service platform.

17. The control method according to the claim 11, wherein by the main platform of the management platform, integrating the data files with the corresponding manufacturing parameters, and selecting the optimal finished product parameter according to the calculation rule comprises: obtaining test results of finished products manufactured by the main production line device at the different execution times according to the different configuration files, each of the test results including at least one test item, and the test results corresponding to the finished product parameters; determining preliminary target manufacturing parameters based on the test results; and the control method further comprises: adjusting preliminary target manufacturing parameters, and determining target manufacturing parameters corresponding to the main production line device and the at least one sub-production line device, respectively, the target manufacturing parameters being included in the configuration files.

18. The control method according to claim 17, wherein the determining the preliminary target manufacturing parameters based on the test results comprises: obtaining standard test results; and determining the preliminary target manufacturing parameters based on differences between the test results and the standard test results.

19. The control method according to the claim 18, wherein the determining the preliminary target manufacturing parameters based on the differences between the test results and the standard test results comprises: constructing test result vectors based on the test results, and constructing standard test result vectors based on the standard test results; and determining differences based on distances between the test result vectors and the standard test result vectors.

20. The control method according to claim 17, wherein the adjusting the preliminary target manufacturing parameters and determining the target manufacturing parameters corresponding to the main production line device and the at least one sub-production line device, respectively comprises: determining at least one set of candidate adjustment manners based on the preliminary target manufacturing parameters; predicting test results of the at least one set of candidate adjustment manners based on a prediction model to obtain prediction test results; and determining the target manufacturing parameters of the main production line device and the at least one sub-production line device based on the prediction test results.

* * * * *